(12) United States Patent
Garez et al.

(10) Patent No.: US 8,648,581 B2
(45) Date of Patent: Feb. 11, 2014

(54) VOLTAGE MODE PUSH-PULL DRIVER OUTPUT STAGE WITH TUNABLE RESISTANCES

(75) Inventors: Jerome Garez, Le Rouret (FR); Wim Cops, Le Rouret (FR)

(73) Assignee: Mindspeed Technologies, Inc., Newport Beach, CA (US)

( * ) Notice: Subject to any disclaimer, the term of this patent is extended or adjusted under 35 U.S.C. 154(b) by 428 days.

(21) Appl. No.: 12/661,432

(22) Filed: Mar. 16, 2010

(65) Prior Publication Data

US 2010/0253300 A1 Oct. 7, 2010

Related U.S. Application Data

(60) Provisional application No. 61/211,864, filed on Apr. 3, 2009.

(51) Int. Cl.
G05F 1/00 (2006.01)

(52) U.S. Cl.
USPC .......................................... 323/271; 323/282

(58) Field of Classification Search
USPC .......... 283/271, 282; 330/297, 127, 129, 305; 323/271, 282
See application file for complete search history.

(56) References Cited

U.S. PATENT DOCUMENTS

| 5,942,940 | A  | * | 8/1999  | Dreps et al. | .................... | 330/253 |
| 6,411,126 | B1 | * | 6/2002  | Tinsley et al. | .................. | 326/83 |
| 7,132,849 | B2 | * | 11/2006 | Tucker et al. | .................. | 326/38 |
| 7,924,056 | B2 | * | 4/2011  | Kumar et al. | .................... | 326/83 |

* cited by examiner

*Primary Examiner* — Adolf Berhane
*Assistant Examiner* — Emily P Pham
(74) *Attorney, Agent, or Firm* — Farjami & Farjami LLP

(57) ABSTRACT

There is provided a voltage mode push-pull driver output stage with low power consumption and improved output return loss (ORL) suitable for various high bandwidth data transmission applications. By structuring the output stage to have tunable resistances adjustable by voltages applied to transistors, the output stage is readily adaptable to different applications requiring different resistances or impedance matching.

20 Claims, 2 Drawing Sheets

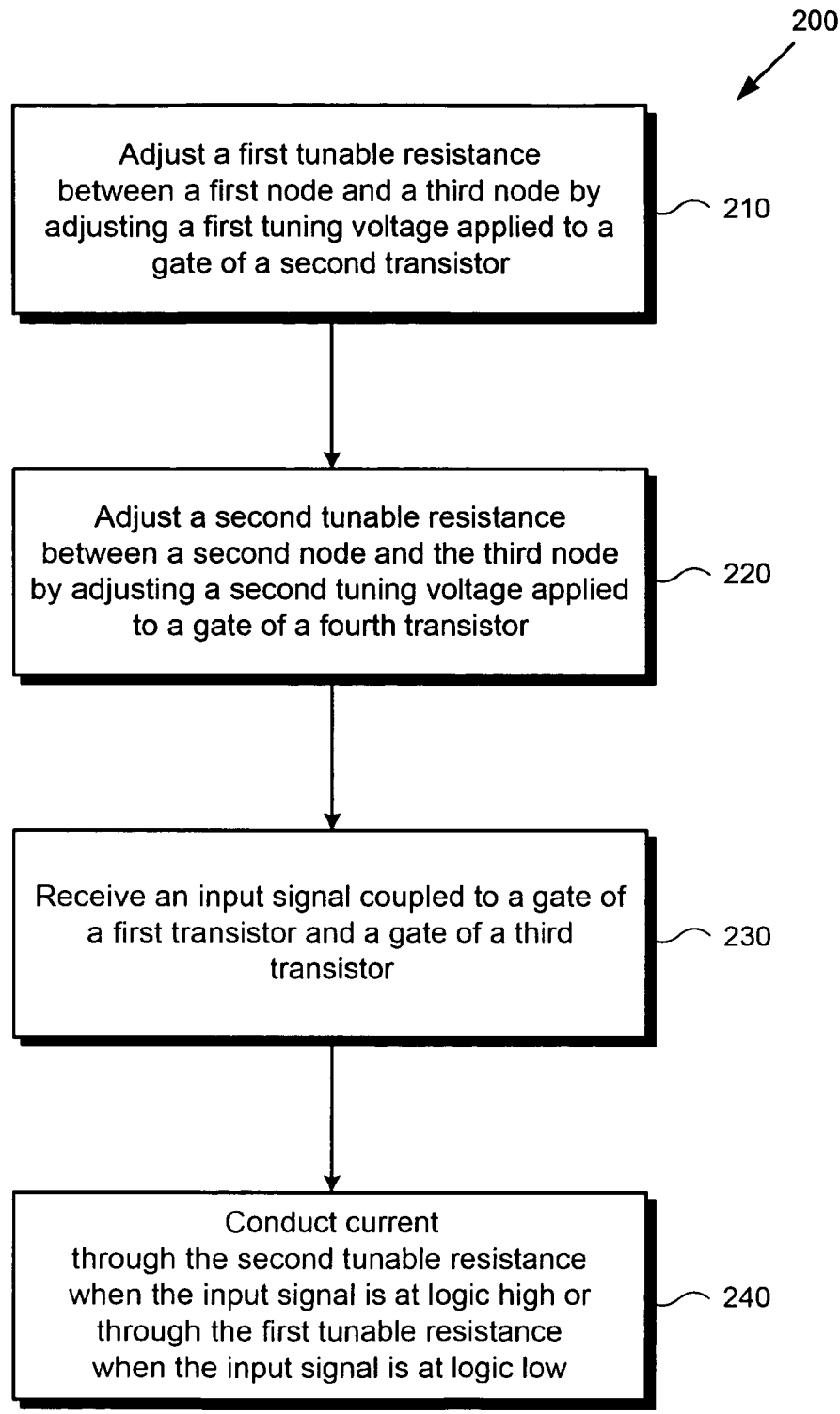

US 8,648,581 B2

VOLTAGE MODE PUSH-PULL DRIVER OUTPUT STAGE WITH TUNABLE RESISTANCES

RELATED APPLICATIONS

This application claims priority to U.S. Provisional Application No. 61/211,864, filed Apr. 3, 2009, which is hereby incorporated by reference in its entirety.

BACKGROUND OF THE INVENTION

1. Field of the Invention

The present invention is generally in the field of electrical circuits. More specifically, the present invention is in the field of cable drivers.

2. Background Art

Cable drivers are used to amplify and transmit data signals, such as video or audio, through interconnect cables from one device to another. For example, in professional video applications such as operating a television or broadcast studio, several devices with multiple input and output ports may need to be interconnected, including routers, distribution amplifiers, and switchers. As supporting infrastructure continually expands to support more devices and port interconnections, it becomes increasingly important to optimize the power consumption of the cable drivers in such devices to reduce operating costs and improve reliability. Furthermore, with the proliferation of high bandwidth video such as high definition 1080P video and the adoption of the 3G-Serial Digital Interface (SDI), it is also increasingly important to improve the output return loss (ORL) of the cable driver to preserve the quality of the transmitted signal.

Conventionally, current mode output stages are used in such video cable drivers. However, current mode output stages require undesirably high levels of power consumption and typically require large output transistors, which undesirably degrade ORL, especially at high bandwidth 3G-SDI data transmission rates. One known method of mitigating ORL degradation in conventional current mode cable drivers utilizes external inductance and resistance on the outputs. However, this method undesirably requires external components and custom tuning for each particular application.

Accordingly, there is a need to overcome the drawbacks and deficiencies in the art by providing a cable driver output stage with low power consumption and improved ORL suitable for various high bandwidth data transmission applications.

SUMMARY OF THE INVENTION

There are provided systems and methods for voltage mode push-pull driver output stage, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2 shows a flowchart describing the steps, according to one embodiment of the present invention, by which a voltage mode push-pull output stage can operate a driver.

DETAILED DESCRIPTION OF THE INVENTION

Figure 1:
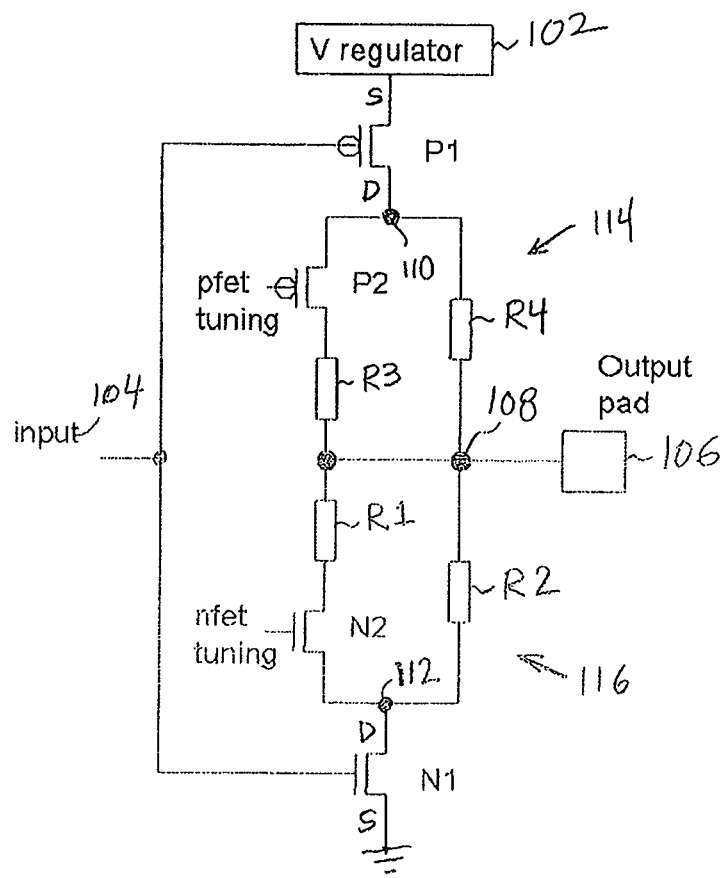
FIG. 1 shows a circuit diagram of voltage mode push-pull output stage, according to one embodiment of the invention.

Although the invention is described with respect to specific embodiments, the principles of the invention can obviously be applied beyond the specifically described embodiments of the invention described herein. Moreover, in the description of the present invention, certain details have been left out to not obscure the inventive aspects of the invention. The details left out are within the knowledge of a person of ordinary skill in the art. The drawings in the present application and their accompanying detailed description are directed to merely example embodiments of the invention. To maintain brevity, other embodiments of the invention which use the principles of the present invention are not specifically described in the present application and are not specifically illustrated by the present drawings.

Various embodiments of the present invention provide a voltage mode push-pull output stage for a driver, such as a cable driver, that provides substantially reduced power consumption and improved ORL, as well as other advantages as discussed below. The invention's voltage mode push-pull output stage also provides an integrated output termination, such as a 75 ohm output termination.

FIG. 1 shows a circuit diagram of voltage mode push-pull output stage 100 (hereinafter referred to simply as "output stage 100" in the patent application), according to one embodiment of the invention. Output stage 100 can be an output stage for a driver, such as a cable driver and can be driven by a pre-driver (not shown in FIG. 1). Output stage 100 has a programmable output impedance, which can be, for example, 75 ohms. In one embodiment, the output impedance of output stage 100 can be 50 ohms. Output stage 100 is coupled between voltage regulator 102 and ground and includes transistors P1 and P2, which can be, for example, P channel field effect transistors (PFETs), transistors N1 and N2, which can be, for example, N channel FETs (NFETs), and resistors R1, R2, R3, and R4. Output stage 100 can be configured to receive input 104 and provide an output at output pad 106. Input 104 can be a DC voltage that can switch between 0.0 volts and a regulated voltage (Vreg) at a high frequency. Input 104 can have a data rate of, for example, between 100 megabits per second (Mb/s) and 3 gigabits per second (Gb/s).

As shown in FIG. 1, input 104 is coupled to the gates of P1 and N1, the source of P1 is coupled to voltage regulator 102, and the drain of transistor P1 is coupled to node 110. Voltage regulator 102 can provide a DC voltage of, for example, approximately 1.6 volts. In another embodiment, voltage regulator 102 can provide a DC voltage that is higher or lower than 1.6 volts. Tunable resistance 114, which includes R3 coupled in series with P2 and R4 coupled across R3 and P2, is coupled between node 110 and node 108, which is coupled to output pad 106. As shown, the drain of transistor P1 is coupled to node 110, tunable resistance 114 also includes transistor P1. Also shown in FIG. 1, the source of N1 is coupled to ground and the drain of N1 is coupled to node 112. Tunable resistance 116, which includes R1 coupled in series with N2 and R2 coupled across R1 and N2, is coupled between node 112 and node 108. As further shown, the drain of transistor N1 is coupled to node 112, tunable resistance 116 also includes transistor N1.

When input 104 is at logic "1" (i.e. a logic high level), N1 conducts current and P1 is off, and when input 104 is at logic "0" (i.e. a logic low level), P1 conducts current and N1 is off. When N1 is turned on, current can flow through tunable resistance 116, which can be tuned so as to provide a desired resistance between output pad 106 and ground. For example, tunable resistance 116 can be tuned to provide approximately 75 ohms between output pad 106 and ground. Tunable resistance 116 can be tuned by applying an appropriate DC tuning voltage to the gate of N2 so as to cause a desired resistance (i.e. output impedance), such as approximately 75 ohms, to be provided between output pad 106 and ground. For example, a replica circuit corresponding to output stage 100 can be utilized to determine the tuning voltage to be applied to the gate of N2. In the replica circuit, N1 can be turned on with a logic "1" and a known current can be forced into node 108, forming a loop. The voltage on the gate of N2 in the replica circuit can then be adjusted so that the voltage at node 108 is equal to a reference voltage, which can be determined by the resistance, such as approximately 75 ohms, that is to be provided between output pad 106 and ground. The adjusted voltage that is applied to the gate of N2 in the replica circuit can determine the tuning voltage to be applied to the gate of N2 to achieve the desired resistance between output pad 106 and ground in output stage 100.

In one embodiment, the DC tuning voltage applied to the gate of N2 can be controlled by means of an external resistance Rset and the replica of output stage 100. A loop can set the DC tuning voltage so that the equivalent replica impedance is proportional to the external resistance.

When P1 is turned on, current can flow through tunable resistance 114, which can be tuned so as to provide a desired resistance, such as approximately 75 ohms, between voltage regulator 102 and output pad 106. Tunable resistance 114 can be tuned by applying an appropriate DC tuning voltage to the gate of P2 so as to cause a desired resistance (i.e. output impedance), such as approximately 75 ohms, to be provided between voltage regulator 102 and output pad 106. Tunable resistance 114 can be tuned in a similar manner as tunable resistance 116. For example, another replica circuit corresponding to output stage 100 can be utilized to determine the tuning voltage to be applied to the gate of P2. In the replica circuit, P1 can be fully turned on by applying a logic "0" to the gate of P1. A known current can be injected into the source of P1 at voltage regulator 102 and the gate of P2 can be adjusted to provide a reference voltage at node 108. In one embodiment of the invention, the reference voltage can be approximately 1.2 volts, which can correspond to a logic "1" at output pad 106. The adjusted voltage that is applied to the gate of P2 in the replica circuit can determine the tuning voltage to be applied to the gate of P2 to achieve the desired resistance between voltage regulator 102 and output pad 106 in output stage 100.

In one embodiment, the DC tuning voltage applied to the gate of P2 can be controlled by means of an external resistance Rset and the replica of output stage 100. A loop can set the DC tuning voltage so that the equivalent replica impedance is proportional to the external resistance.

In output stage 100, output pad 106 can be AC coupled to a load by a capacitor, for example. Output stage 100 can provide an output pulse at output pad 106 having a peak-to-peak voltage swing of, for example, approximately 800 millivolts (mV)±10 percent. To achieve a voltage swing of approximately 800 mV, the logic low can be approximately 0.4 volts and the logic high can be approximately 1.2 volts at output pad 106.

When N1 is on and P1 is off, current can flow through tunable resistance 116 and N1 and a logic "0" (logic low) is produced at output pad 106. When N1 is on, an output impedance, such as a 75 ohm impedance, can be defined between output pad 106 and ground by the bottom half of output stage 100. When P1 is on and N1 is off, current can flow from voltage regulator 102 through P1 and tunable resistance 114 to output pad 106. The current flowing to output pad 106 can provide a voltage at output pad 106 that defines a logic "1" (logic high). When P1 is on, an output impedance, such as a 75 ohm impedance, can be defined between voltage regulator 102 and output pad 106 by the top half of output stage 100.

In output stage 100, current flowing in the internal output termination actually contributes to the voltage swing and the output is truly single-ended. The current required to provide amplitude Vamp when output pad 106 is coupled to a receiver having a termination Rterm can be $I=Vamp/(2 \cdot Rterm)$ (assuming Rterm is equal to the output termination of output stage 100). In a conventional current mode driver, the internal output termination is in parallel with the receiver output termination. As a result, the current required to provide the same output amplitude can be $I=(2 \cdot Vamp)/Rterm$. Consequently, the conventional current mode driver can require four times as much current as output stage 100 to provide the same output voltage swing. Also, the conventional current mode driver provides differential outputs. Thus, current is wasted in the conventional current mode driver when both outputs are not being utilized. Thus, the invention's voltage mode push-pull output stage substantially reduces power consumption compared to a conventional current mode driver.

Also, since there is less current flowing into N1 and P1, those transistors can be smaller and, consequently, easier to drive. As a result, the circuit (e.g. pre-driver) driving the input of output stage 100 can advantageously consume less power and can be easier to design. In output stage 100, P2, N2, R1, R2, R3, and R4 can also be reduced in size, which can reduce manufacturing cost. Also, output stage 100 can advantageously consume less area on an IC chip.

Additionally, since N1 and P1 are smaller, they have less parasitic capacitance. As result, the parasitic capacitance on output pad 106 can be reduced, which can advantageously improve return loss at high frequency.

Further, the invention's voltage mode push-pull output stage can provide improved duty cycle dispersion (DCD) characteristics, thereby advantageously reducing jitter.

Moreover, by utilizing a voltage regulator, the invention's voltage mode push-pull output stage can advantageously provide increased power supply noise rejection.

Moving to FIG. 2, FIG. 2 shows a flowchart describing the steps, according to one embodiment of the present invention, by which a voltage mode push-pull output stage can operate a driver. Certain details and features have been left out of flowchart 200 of FIG. 2 that are apparent to a person of ordinary skill in the art. For example, a step may consist of one or more sub-steps or may involve specialized equipment, as known in the art. While steps 210 through 240 shown in flowchart 200 are sufficient to describe one embodiment of the present invention, other embodiments of the invention may utilize steps different from those shown in flowchart 200.

At step 210, the output stage adjusts a first tunable resistance between a first node and a third node by adjusting a first tuning voltage applied to a gate of a second transistor. Referring to FIG. 1, this corresponds to output stage 100 adjusting tunable resistance 114 between node 110 and node 108 by adjusting a first tuning voltage applied to a gate of transistor P2. As described above, feeding a known current through a replica circuit of output stage 100 may be utilized to determine the appropriate first tuning voltage for setting a desired output impedance between voltage regulator 102 and output pad 106, such as 50 or 75 ohms. Alternatively, as also described above, the first tuning voltage may be controlled by means of external resistance and the replica circuit.

At step 220, the output stage adjusts a second tunable resistance between a second node and the third node by adjusting a second tuning voltage applied to a gate of a fourth transistor. Step 220 may be carried out in a manner similar to step 210. Referring to FIG. 1, this corresponds to output stage 100 adjusting tunable resistance 116 between node 112 and node 108 by adjusting a second tuning voltage applied to a gate of transistor N2. As described above, feeding a known current through a replica circuit of output stage 100 may be utilized to determine the appropriate second tuning voltage for setting a desired output impedance between ground and output pad 106, such as 50 or 75 ohms. Alternatively, as also described above, the second tuning voltage may be controlled by means of external resistance and the replica circuit.

At step 230, the output stage receives an input signal coupled to a gate of a first transistor and a gate of a third transistor. Referring to FIG. 1, this corresponds to output stage 100 receiving input 104 coupled to a gate of transistor P1 and a gate of transistor N1.

At step 240, the output stage conducts current through the second tunable resistance when the input signal is at logic high or through the first tunable resistance when the input signal is at logic low. As discussed above, when transistor N1 receives input 104 as logic high, current travels through tunable resistance 116, and transistor P1 goes into an off state. As previously described, output stage 100 may be configured such that output pad 106 receives approximately 0.4 volts representing logic low. On the other hand, when transistor P1 receives input 104 as logic low, current travels through tunable resistance 114, and transistor N1 goes into an off state. As previously described, output stage 100 may be configured such that output pad 106 receives approximately 1.2 volts representing logic high. As a result, input 104 is efficiently transmitted by voltage mode push-pull driver output stage 100 through output pad 106, which may, for example, further transmit the signal through video cable interconnects to another device.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of operating a driver for use by a voltage mode push-pull output stage having a voltage regulator, the method comprising:
   adjusting a first tunable resistance having a first resistor coupled to an output;
   adjusting a second tunable resistance having a second resistor coupled to the output;
   receiving an input signal, the input signal being coupled to a gate of a first transistor and a gate of a second transistor at a single node, wherein the voltage regulator is coupled to a source of the first transistor, and wherein a second end of the second tunable resistance is coupled to a drain of the second transistor, and a second end of the first tunable resistance is coupled to a drain of the first transistor; and
   conducting a current through the second tunable resistance when the input signal is at logic high or through the first tunable resistance when the input signal is at logic low.

2. The method of claim 1, wherein the first transistor is a P channel field effect transistor (PFET), and wherein the second transistor is an N channel field effect transistor (NFET).

3. The method of claim 1, wherein the adjusting of the first tunable resistance is by adjusting a first tuning voltage.

4. The method of claim 3, wherein the adjusting of the first tuning voltage is controlled by an external resistance.

5. The method of claim 1, wherein the adjusting of the second tunable resistance is by adjusting a second tuning voltage.

6. The method of claim 5, wherein the adjusting of the second tuning voltage is controlled by an external resistance.

7. The method of claim 1, wherein the voltage regulator provides a DC voltage of approximately 1.6 volts.

8. A voltage mode push-pull output stage for a driver, the output stage comprising:
   a voltage regulator;
   a first, a second, and a third node, wherein the third node is coupled to an output pad;
   a first, a second, a third, and a fourth resistor;
   a first, a second, a third, and a fourth transistor, wherein a source of the first transistor is coupled to the voltage regulator, a drain of the first transistor is coupled to the first node, a gate of the first transistor is coupled to an input signal, a source of the third transistor is coupled to a ground, a drain of the third transistor is coupled to the second node, and a gate of the third transistor is coupled to the input signal;
   a first tunable resistance between the first node and the third node, the first tunable resistance comprising the third resistor coupled in series with the second transistor and the fourth resistor coupled in parallel to the third resistor and the second transistor, the first tunable resistance adjusted by a first tuning voltage applied to a gate of the second transistor; and
   a second tunable resistance between the second node and the third node, the second tunable resistance comprising the first resistor coupled in series with the fourth transistor and the second resistor coupled in parallel to the first resistor and the fourth transistor, the second tunable resistance adjusted by a second tuning voltage applied to a gate of the fourth transistor.

9. The output stage of claim 8, wherein the first transistor and the second transistor each comprise a P channel field effect transistor (PFET), and wherein the third transistor and the fourth transistor each comprise an N channel field effect transistor (NFET).

10. The output stage of claim 8, wherein the second tuning voltage is adjusted such that an output impedance of approximately 75 ohms is provided between the output pad and the ground.

11. The output stage of claim 8, wherein the second tuning voltage is controlled by an external resistance and a replica circuit of the output stage, wherein a loop sets the second tuning voltage so that an equivalent replica impedance of the replica circuit is proportional to the external resistance.

12. The output stage of claim 8, wherein the first tuning voltage is adjusted such that an output impedance of approximately 75 ohms is provided between the output pad and the voltage regulator.

13. The output stage of claim 8, wherein the first tuning voltage is controlled by an external resistance and a replica circuit of the output stage, wherein a loop sets the first tuning voltage so that an equivalent replica impedance of the replica circuit is proportional to the external resistance.

14. The output stage of claim 8, wherein the output pad is AC coupled to a load by a capacitor, and wherein the output stage is configured to provide a peak-to-peak voltage swing of approximately 800 millivolts (mV)±10 percent where logic low at the output pad is approximately 0.4 volts and logic high at the output pad is approximately 1.2 volts.

15. The output stage of claim 8, wherein the voltage regulator provides a DC voltage of approximately 1.6 volts.

16. The output stage of claim 8, wherein the input signal comprises a DC voltage switching at high frequency between 0.0 volts and a regulated voltage at a data rate between 100 megabits per second (Mb/s) and 3 gigabits per second (Gb/s).

17. The output stage of claim 8, wherein the driver is a video cable driver.

18. A method of operating a driver for use by a voltage mode push-pull output stage having a voltage regulator, a first, a second, and a third node, a first, a second, a third, and a fourth resistor, and a first, a second, a third, and a fourth transistor, wherein the third node is coupled to an output pad, a source of the first transistor is coupled to the voltage regulator, a drain of the first transistor is coupled to the first node, a source of the third transistor is coupled to a ground, and a drain of the third transistor is coupled to the second node, the method comprising:

adjusting a first tunable resistance between the first node and the third node by adjusting a first tuning voltage applied to a gate of the second transistor, the first tunable resistance comprising the third resistor coupled in series with the second transistor and the fourth resistor coupled in parallel to the third resistor and the second transistor;

adjusting a second tunable resistance between the second node and the third node by adjusting a second tuning voltage applied to a gate of the fourth transistor, the second tunable resistance comprising the first resistor coupled in series with the fourth transistor and the second resistor coupled in parallel to the first resistor and the fourth transistor;

receiving an input signal coupled to a gate of the first transistor and a gate of the third transistor; and conducting a current through the second tunable resistance when the input signal is at logic high or through the first tunable resistance when the input signal is at logic low.

19. The method of claim 18, wherein the first transistor and the second transistor each comprise a P channel field effect transistor (PFET), and wherein the third transistor and the fourth transistor each comprise an N channel field effect transistor (NFET).

20. The method of claim 18, wherein the adjusting of the second tuning voltage is controlled by an external resistance and a replica circuit of the output stage, wherein a loop sets the second tuning voltage so that an equivalent replica impedance of the replica circuit is proportional to the external resistance.

* * * * *